United States Patent
Reyzin et al.

(10) Patent No.: US 8,280,939 B2
(45) Date of Patent: Oct. 2, 2012

(54) METHODS AND APPARATUS FOR AUTOMATIC ACCURACY-SUSTAINING SCALING OF BLOCK-FLOATING-POINT OPERANDS

(75) Inventors: Igor Reyzin, Needham, MA (US); Aleksey Lipchin, Newton, MA (US)

(73) Assignee: VideoIQ, Inc., Bedford, MA (US)

( * ) Notice: Subject to any disclaimer, the term of this patent is extended or adjusted under 35 U.S.C. 154(b) by 1079 days.

(21) Appl. No.: 12/125,536

(22) Filed: May 22, 2008

(65) Prior Publication Data
US 2009/0292750 A1   Nov. 26, 2009

(51) Int. Cl.
G06F 7/483   (2006.01)

(52) U.S. Cl. ........................................ 708/498

(58) Field of Classification Search .................. None
See application file for complete search history.

(56) References Cited

U.S. PATENT DOCUMENTS

| | | | |
|---|---|---|---|
| 4,872,132 A | 10/1989 | Retter | |
| 6,173,247 B1 | 1/2001 | Maurudis et al. | |
| 6,411,978 B1 * | 6/2002 | Naveh et al. | 708/404 |
| 6,460,177 B1 | 10/2002 | Lee | |
| 6,728,739 B1 * | 4/2004 | Kobayashi et al. | 708/208 |
| 6,996,597 B2 | 2/2006 | Mathur et al. | |
| 2004/0128119 A1 | 7/2004 | Maurudis et al. | |
| 2008/0263121 A1 * | 10/2008 | Carlson et al. | 708/505 |

OTHER PUBLICATIONS

Altera, "FFT/IFFT Block Bloating Point Scaling," Oct. 2005.
Bores Signal Processing, "Introduction to DSP—DSP Processors; Data Formats," www.bores.com/courss/intro/chips/6, Apr. 17, 2008.
Kobayashi et al., "A New Approach for Block-Floating-Point Arithmetic," Mobile Communications Systems, Dresden University of Technology, 4 pp., no. date.
Kum et al., "A Floating-Point to Integer C Converter with Shift Reduction for Fixed-Point Digital Signal Processors," School of Electrical Engineering, Seoul National University, 4 pp., no. date.
Kum et al., "A Floating-Point to Fixed-Point C Converter for Fixed-Point Digital Signal Processors," School of Electrical Engineering, Seoul National University, 16 pp., no. date.
Menard et al., "Automatic Floating-Point to Fixed-Point Conversion for DSP Code Generation," CASES 2002, pp. 270-276, Oct. 8-11, 2002.
Mitra, "On Finite Wordlength Properties of Block-Floating-Point Arithmetic," International Journal of Signal Processing Volume, vol. 2, No. 2, pp. 120-125, 2005.

* cited by examiner

Primary Examiner — David H Malzahn
(74) Attorney, Agent, or Firm — Stoel Rives LLP

(57) ABSTRACT

A computer-implemented method performs an operation on a set of at least one BFP operands to generate a BFP result. The method is designed to reduce the risks of overflow and loss of accuracy attributable to the operation. The method performs an analysis to determine respective shift values for each of the operands and the result. The method calculates result mantissas by shifting the stored bit patterns representing the corresponding operand mantissa values by their respective associated shift values determined in the analysis step, performing the operation on shifted operand mantissas to generate preliminary result mantissa, and shifting the preliminary result mantissas by a number of bits determined in the analysis step.

45 Claims, 10 Drawing Sheets

US 8,280,939 B2

METHODS AND APPARATUS FOR AUTOMATIC ACCURACY-SUSTAINING SCALING OF BLOCK-FLOATING-POINT OPERANDS

TECHNICAL FIELD

The field of this disclosure relates generally to computer arithmetic processing and calculation, and more particularly but not exclusively to computer arithmetic processing and calculation with block-floating-point number representations.

BACKGROUND INFORMATION

Numbers are represented in the binary number system using the binary digits or "bits" 0 and 1. Binary numbers are utilized extensively in digital electronics, including computers, as digital circuits can conveniently store, convey and manipulate two-state electrical signals. Several binary number representation formats have been developed to support data storage, transmission and manipulation.

The simplest binary number representation format is the fixed-point format, in which the binary point, which denotes the boundary between the whole-number portion and the fractional portion of the number (just like the "decimal point" in the decimal number format) is in a fixed position. An example of a fixed-point format 100 is illustrated in FIG. 1 in which the binary point 105 is understood to be between the fourth and fifth bits (from the right). The first number depicted in FIG. 1 is therefore $2^6+2^5+2^2+2^1+2^{-1}+2^{-3}=102.625$. The fixed-point format 100 has a minimum value of 0, maximum value of 255.9375 and a resolution of 0.0625 in unsigned form. In other words, the fixed-point format 100 in unsigned form can represent any number between 0 and 255.9375 (inclusive) in 0.0625 increments. In signed form (e.g., using a dedicated sign bit or two's-complement form), the range of the fixed-point format 100 is from −128 to 127.9375 in 0.0625 increments. A special case of the fixed-point format is integers, in which case the binary point 105 is fixed after the least significant bit (LSB) on the right and there is therefore no fractional part.

An advantage of fixed-point formats is that hardware for performing mathematical operations is relatively low in complexity. For example, fixed-point adders, multipliers, arithmetic logic units (ALUs) and the like can be constructed with a relatively small number of circuit elements, thereby minimizing circuit size, weight and power consumption, while also being capable of executing fast.

However, disadvantages of fixed-point formats include their limited range and/or accuracy. Range and accuracy can be traded-off during ex ante design by placement of the binary point, but once the binary point is chosen it cannot be changed. There is a finite number of possible values that can be represented by a given number of bits. In general, N bits can represent $2^N$ different values. Another disadvantage, related to the limited range/accuracy, is that the circuit designer or programmer who programs a fixed-point arithmetic unit (such as a fixed-point ALU) must carefully ensure that no numbers outside of the fixed-point format's range (overflow) or smaller than the minimum increment (underflow) result.

An alternative binary number representation format is the floating-point format, in which the position of the binary point "floats." An example of a floating-point format 200 is illustrated in FIG. 2. Each floating-point number has two parts: a mantissa M (sometimes called "significand") and an exponent E. The value of a number in floating-point format 200 is $M \times B^E$ where B is a base, which is typically two. A binary point 205 can be thought of as being fixed at some position along the mantissa M, but it effectively moves by changing the exponent E. The exponent E may itself be a signed integer. In base two, for example, incrementing or decrementing the exponent E has the same effect as moving the binary point 205 one position to the right or left, respectively. In the floating-point format 200 illustrated in FIG. 2, the binary point 205 is shown before the most significant bit (MSB) of the mantissa M, but it could be placed elsewhere.

As shown, the first number depicted in FIG. 2 is $(2^{-2}+2^{-3}+2^{-6}+2^{-7}) \times 2^{10} = 204.0$. The maximum value that may be represented in floating-point format 200 is $0.99606375 \times 2^{15} = 32{,}604$, accurate to within increments of $1/256 = 0.00390625$, in unsigned form. To represent signed numbers, the mantissa M may employ a signed form, or more typically a separate sign bit (not shown) may be utilized. By utilizing a greater number of bits for the mantissa M and/or the exponent E, the range and/or accuracy may be extended. The IEEE (Institute of Electrical and Electronics Engineers) standard 745-1985 for binary floating-point arithmetic utilizes one sign bit, eight exponent bits, and 23 fractional mantissa bits for single-precision numbers (referred to as type "float" in the C programming language and its variants), and one sign bit, 11 exponent bits, and 52 fractional mantissa bits for double-precision numbers (referred to as type "double" in the C programming language and its variants).

As can be seen from the examples in FIGS. 1 and 2, both of which employ 12 bits, a floating-point representation offers significantly greater range and accuracy. A disadvantage of floating-point representations, however, is that the hardware circuits needed to perform arithmetic and other operations on floating-point numbers are significantly larger and more complex, requiring more size, weight and power, while operating at a slower speed than fixed-point circuitry. While many central processing units (CPUs) in general-purpose computers utilize a floating-point format for numeric data, many digital signal processors (DSPs) and processors and controllers utilized in embedded applications utilize fixed-point hardware due to size, weight, power and/or speed constraints.

It is convenient to write high-level program source code using floating-point variables and operations. However, when performance requirements dictate that the program operate on fixed-point hardware, then the floating-point code must be converted to fixed-point form. Manual conversion is tedious and error-prone and can increase development time significantly. As an alternative, code converters or code generators can convert high-level program source code containing floating-point variables and operations into fixed-point implementations. For example, U.S. Pat. No. 6,460,177, and a paper entitled "A Floating-Point to Integer C Converter with Shift Reduction For Fixed-Point Digital Signal Processors" by K. Kum et al. in Proceedings of the IEEE ICASSP, pp. 2163-66 (March 1999) describe tools to convert floating-point C code to integer C code. In order to have some assurance that the resulting integer variables accommodate the data without overflow, such tools typically estimate the range of values held by floating-point variables in the original C code. Range estimation, which is often done using statistical techniques, is often imperfect and may need to be repeated whenever the code changes. Other tools for converting floating-point code to fixed-point code are specific to certain processors, as they rely on knowledge of the processor architecture, such as disclosed in U.S. Pat. No. 6,173,247.

Block-floating-point (BFP) format is a third alternative to fixed-point and floating-point representations. A RFP representation of a set of N binary numbers has N unique mantissas and one common exponent that applies to all of the mantissas. An example BFP representation 300 is illustrated in FIG. 3, which depicts a set of block-floating-point numbers, in which the mantissas are labeled $M_1, M_2, \ldots, M_N$, the exponent is labeled E, and a binary point 305 is shown to the left of the MSB. A BFP representation has many of the same range and accuracy advantages of floating-point representations but BFP variables also can be manipulated by simpler hardware. In particular, mantissas in the same block can often be manipulated arithmetically as if they were fixed-point numbers, a feature that is attributable to the fact that all mantissas M share the same exponent E.

A downside of the BFP format is that the shared exponent can create some accuracy and overflow complications. To avoid overflow, all mantissas M must fit within the prescribed mantissa binary word length without overflowing to the left. As calculations are performed, mantissa values may grow and a mantissa perhaps may need to be right-shifted to ensure overflow does not occur. A single bit right shift to mantissa $M_i$ entails incrementing the exponent E by one bit to maintain the same overall value. However, because the common exponent E is shared by all mantissas, the scaling of the mantissas must be coordinated (unlike floating-point format) so that each mantissa is maintained within the fixed word length while making a common adjustment to E. Moreover, each mantissa $M_i$ may becomes less accurate as it is shifted to the right, as information may be lost.

Some DSPs support BFP-formatted data, but in most cases the programmer must explicitly employ the BFP format, and most operations must be manually converted into a BFP form by a programmer, who must actively manage overflow and accuracy considerations. Such attention is time-consuming and error-prone, entailing tasks that substantially increase development time and expense.

DETAILED DESCRIPTION OF EMBODIMENTS

Figure 1:
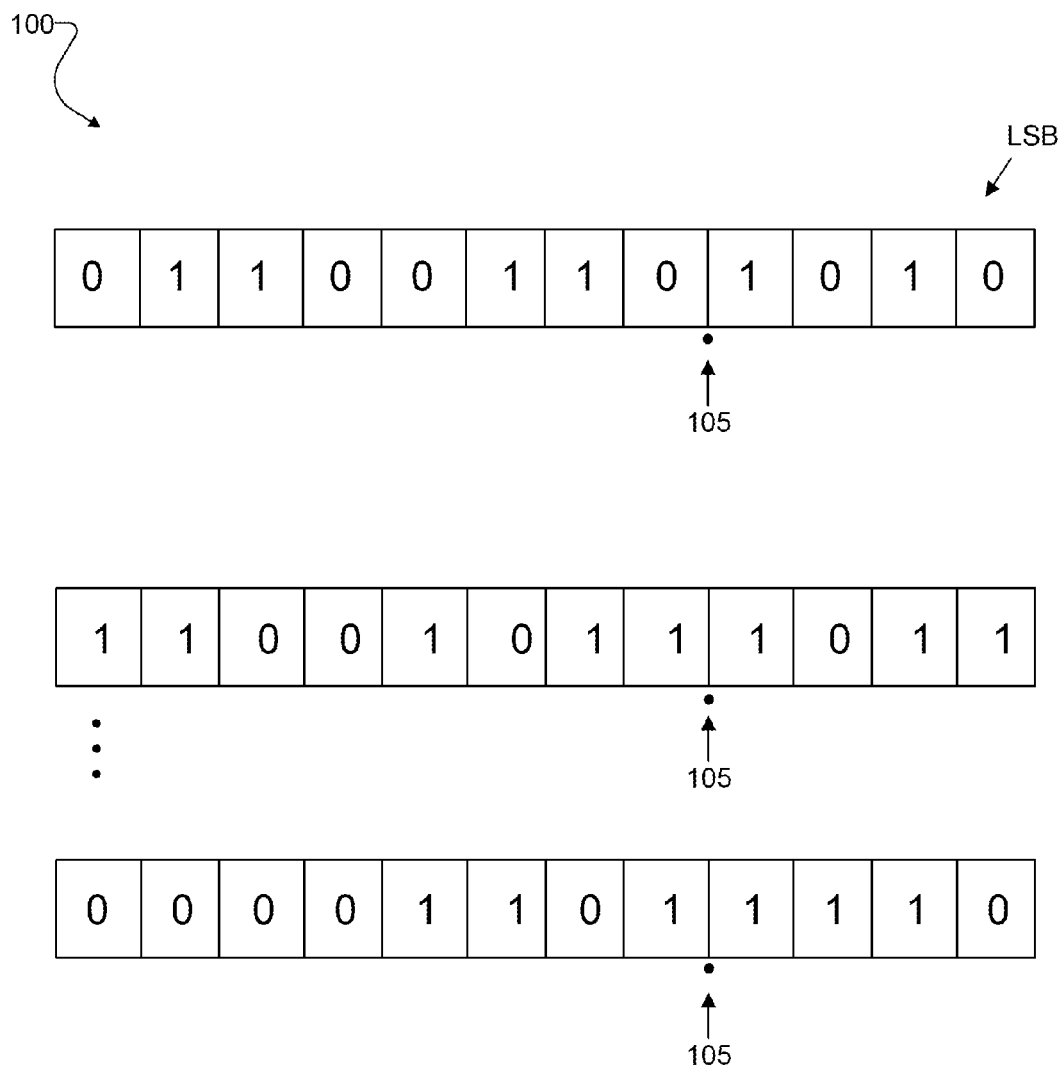
FIG. 1 is an illustration of fixed-point binary representations of a set of numbers.
Figure 2:
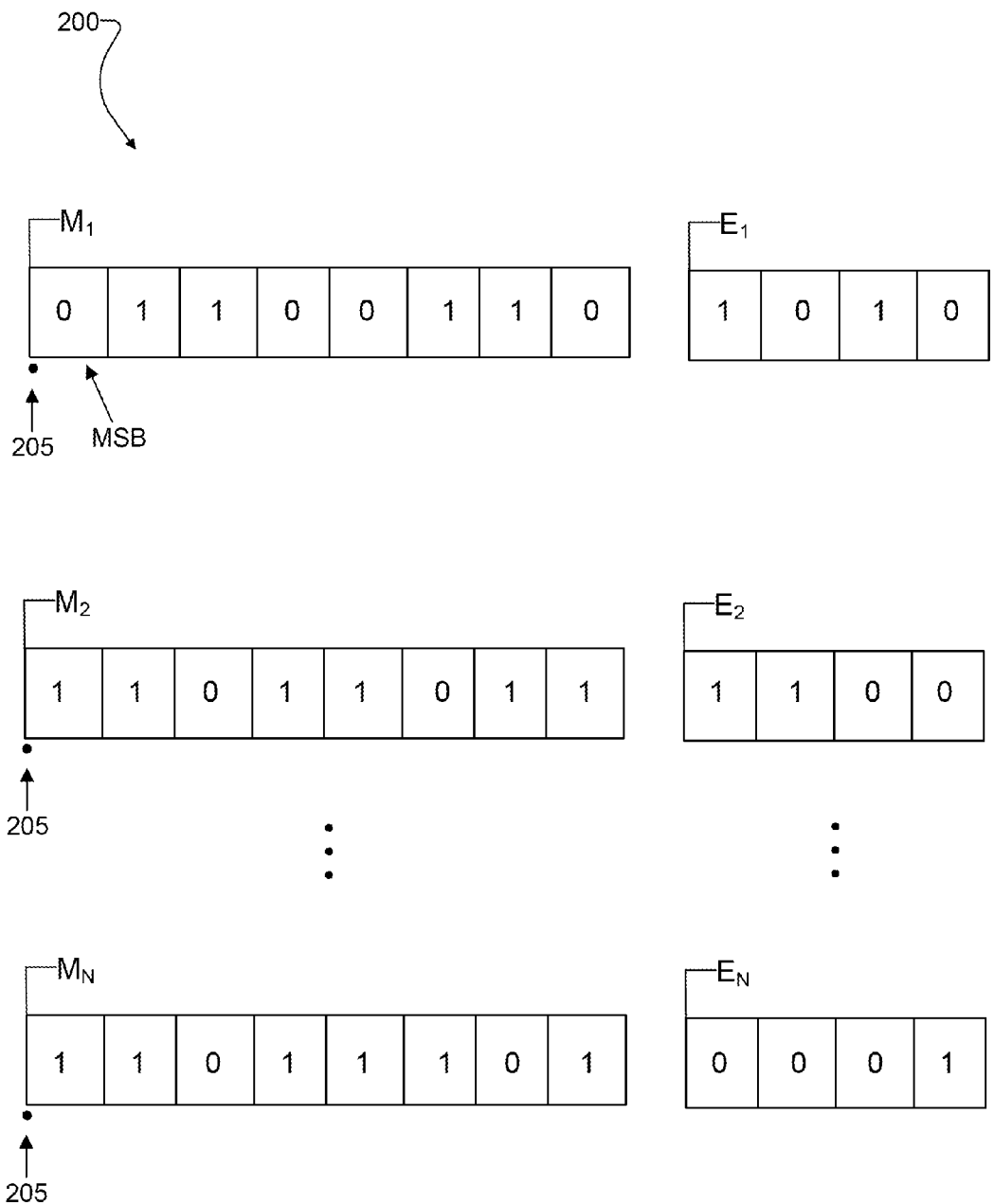
FIG. 2 is an illustration of floating-point binary representations of a set of numbers.
Figure 3:
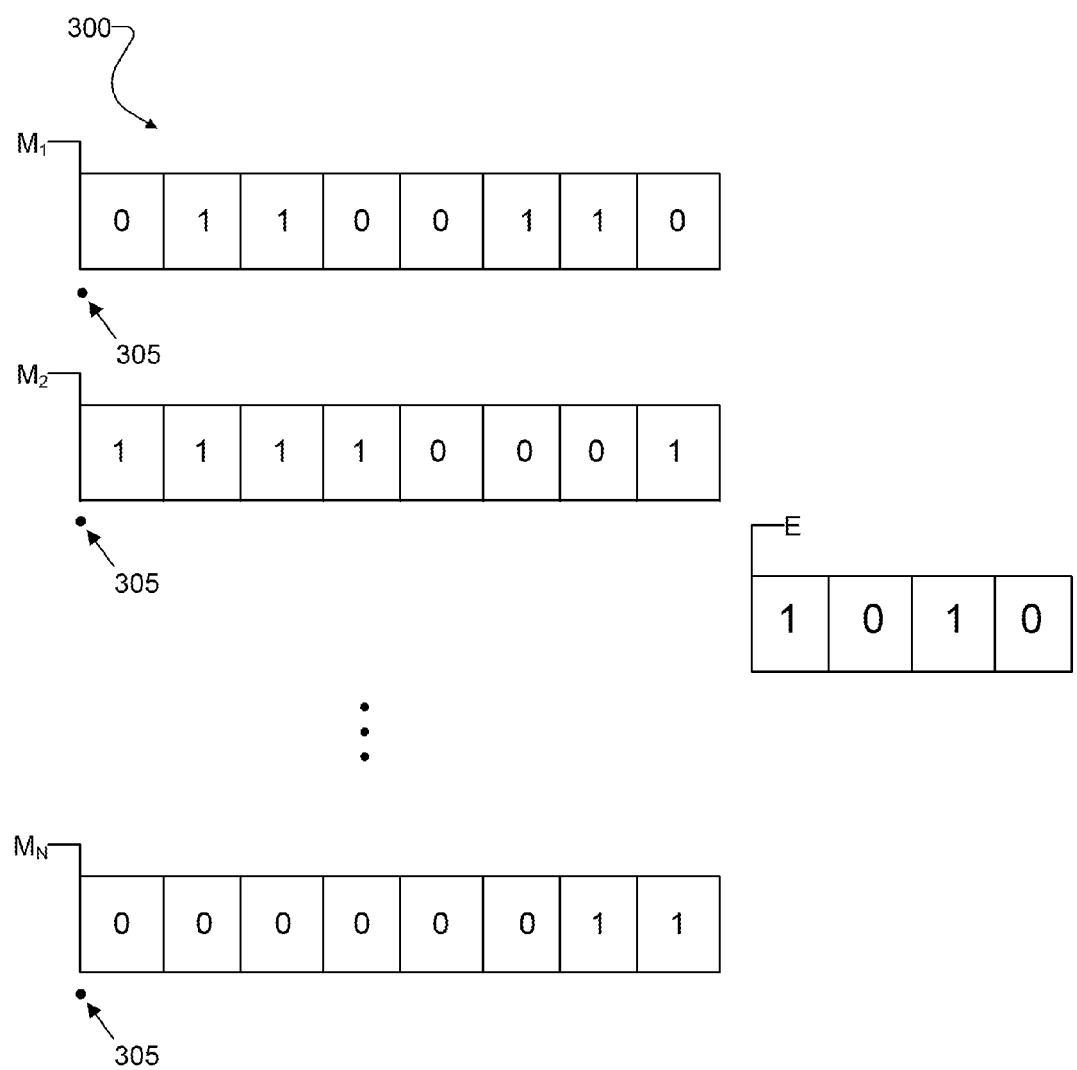
FIG. 3 is an illustration of a block-floating-point binary representation of a set of numbers.

With reference to the above-listed drawings, this section describes particular embodiments and their detailed construction and operation. The embodiments described herein are set forth by way of illustration only and not limitation. Those skilled in the art will recognize in light of the teachings herein that there are alternatives, variations and equivalents to the example embodiments described herein. For example, other embodiments are readily possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

I. OVERVIEW

As one skilled in the art will appreciate in light of this disclosure, certain embodiments may be capable of achieving certain advantages, including, in some cases, some or all of the following: (1) automatic handling of scaling of BFP objects to manage overflow and accuracy (i.e., the programmer/user can write source code as if standard floating point variables were used, with no need to manually manage overflow and accuracy); (2) accuracy is sustained, even perhaps optimized; (3) no range estimation is required; (4) suitability for loops and arrays; (5) compound operations can be handled naturally; (6) applicability to any hardware platform, as no device-specific architecture knowledge is required; (7) code development time can be reduced, perhaps significantly; (8) the risk of errors arising from code development can be lessened; (9) code maintenance and support can be simplified; and (10) suitability for image and/or video processing, which tends to be computationally intensive, loop intensive and array intensive and for which speed requirements can make floating-point implementations impractical or less desirable. These and other advantages of various embodiments will be apparent upon reading this document.

According to one embodiment, a computer-implemented method performs an operation on a set of at least one operand objects to generate a result object. The method is designed to reduce the risks of overflow and loss of accuracy attributable to the operation. The method is implemented on a computer comprising a memory and an arithmetic unit. The method represents and stores in the memory each of the operand objects in a BFP form having an array of mantissa values as well as a common exponent for all mantissa values in the array for a given object. Each mantissa value and common exponent is stored in the memory as a bit pattern. The method generates the result object in a BFP format having an array of mantissa values and a common exponent for all mantissa values associated with the result object. Each mantissa value and common exponent is stored in the memory as a bit pattern. The generating step of the method comprises performing an analysis step to determine respective shift values for each of the operand objects and a shift value for the result object. The generating step of the method also comprises calculating a result mantissa value for each corresponding set of mantissa values associated with the operand objects by: shifting the stored bit patterns representing the corresponding mantissa values in the operand objects by numbers of bits equal to their respective associated shift values determined in the analysis step, performing the operation on corresponding mantissa values in the array portions of the operand objects using the fixed-point arithmetic unit to generate respective preliminary mantissa values for the result object, shifting a bit pattern representing the preliminary mantissa values for the result object by a number of bits equal to the shift value for the result object as determined in the analysis step, and storing the shifted According to another embodiment, an apparatus performs an operation on a set of at least one operand objects to generate a result object. The apparatus is designed to reduce the risks of overflow and loss of accuracy attributable to the operation. The apparatus works in conjunction with a computer comprising a memory and an arithmetic unit. The apparatus comprises a means for representing and storing in the memory each of the operand objects in a BFP form having an array of mantissa values as well as a common exponent for all mantissa values in the array for a given object, wherein each mantissa value and common exponent is stored in the memory as a bit pattern. The apparatus also comprises a means for generating the result object in a BFP format having an array of mantissa values and a common exponent for all mantissa values associated with the result object, wherein each mantissa value and common exponent is stored in the memory as a bit pattern. The generating means comprises a means for performing an analysis step to determine respective shift values for each of the operand objects and a shift value for the result object and a means for calculating a result mantissa value for each corresponding set of mantissa values associated with the operand objects by: shifting the stored bit patterns representing the corresponding mantissa values in the operand objects by numbers of bits equal to their respective associated shift values determined in the analysis step, performing the operation on corresponding mantissa values in the array portions of the operand objects using the fixed-point arithmetic unit to generate respective preliminary mantissa values for the result object, shifting a bit pattern representing the preliminary mantissa values for the result object by a number of bits equal to the shift value for the result object as determined in the analysis step, and storing the shifted preliminary mantissa values in the array portion of the result object in the memory.

According to another embodiment, a computer-implemented method scales a plurality of BFP-formatted operands to perform a mathematical operation on the operands to generate a BFP-formatted result. Each BFP-formatted operand comprises an array of operand mantissa values and a common operand exponent for all mantissa values in an operand array for an individual operand. The BFP-formatted result comprises an array of result mantissa values and a common result exponent for all mantissa values in the array for the result. The method analyzes each of the plurality of the operands to determine scaling factors for each of the operands, wherein the scaling factors are chosen on the basis of extreme mantissa values of the operands and a permissible range of result mantissa values. A criterion for determining the scaling factors is sustaining accuracy of the result subject to the constraint that overflow of the result be avoided. On the basis of the scaling factors, the method shifts bit patterns representing the mantissas right to avoid overflow and left to sustain precision and increments or decrements the corresponding exponent when the mantissas are shifted left or right, respectively. The method computes each element of the array of result mantissa values on the basis of corresponding shifted operand mantissa element values, from which a result mantissa element value is derived.

According to another embodiment, a computer system implements a floating-point array operation using an arithmetic unit while reducing the risks of overflow and loss of accuracy attributable to the operation. The system comprises program code, memory, a scaling routine, and an arithmetic unit. The program code calls for an operation performed on at least one floating-point array operands to yield a floating-point array result. The memory stores each of the at least one floating-point array operands in respective BFP formats as well as the result operand in a BFP format, each BFP-formatted data structure having an array of mantissas as well as a common exponent for all mantissas in its corresponding array of mantissas. Each mantissa and common exponent is stored in the memory as a bit pattern. The scaling routine is called by the program code to analyze the operands to determine scaling factors for each of the operands. The scaling factors are chosen on the basis of extreme mantissa values of the operands and a permissible range of result mantissa values. A criterion for determining the scaling factors is maximizing precision of the result subject to the constraint that overflow of the result be avoided, the scaling routine returning mantissa shift values for each of the operands and the result. Both left and right shift values are permissible. The arithmetic unit is programmed to compute an element of the result mantissa array using the corresponding elements of the operand mantissa arrays as inputs. The program code shifts the elements of the operand mantissa arrays in accordance with shift values returned by the scaling routine. The program code comprises a loop through all elements of the result mantissa array to cause the arithmetic unit to compute the elements of the result mantissa array using corresponding shifted elements of the operand mantissa arrays as inputs. The program code shifts elements of the result mantissa array in accordance with a result shift value returned by the scaling routine.

According to another embodiment, a computer-implemented method automatically scales BFP-formatted operands, intermediate results and a final result for a complex operation that can be decomposed into a sequence of N simple operations consisting of a first simple operation followed by a second simple operation and so on up to an Nth simple operation. The second and subsequent operations utilize as an operand a result from a previous operation in the sequence. The method analyzes the sequence of N simple operations in order to determine for each simple operation scaling factors for its operands and its result. A scaling factor for a result of one simple operation is utilized as an input to determine a scaling factor for a subsequent operation in the sequence. After analyzing the sequence of N simple operations, the method performs a calculation loop to calculate mantissa values of the final result in accordance with the complex operation and based on the mantissa values of the operands, intermediate results and their associated scaling factors determined by the analyzing step. The scaling factors reduce risks of overflow and loss of accuracy otherwise attributable to the complex operation or any of its constituent simple operations.

According to yet other embodiments, computer-readable media can be embedded with program code for implementing any of the above methods, systems and apparatus.

Additional details concerning the construction and operation of particular embodiments are set forth in the following subsections with reference to the above-listed drawings.

II. METHODS

Figure 4:
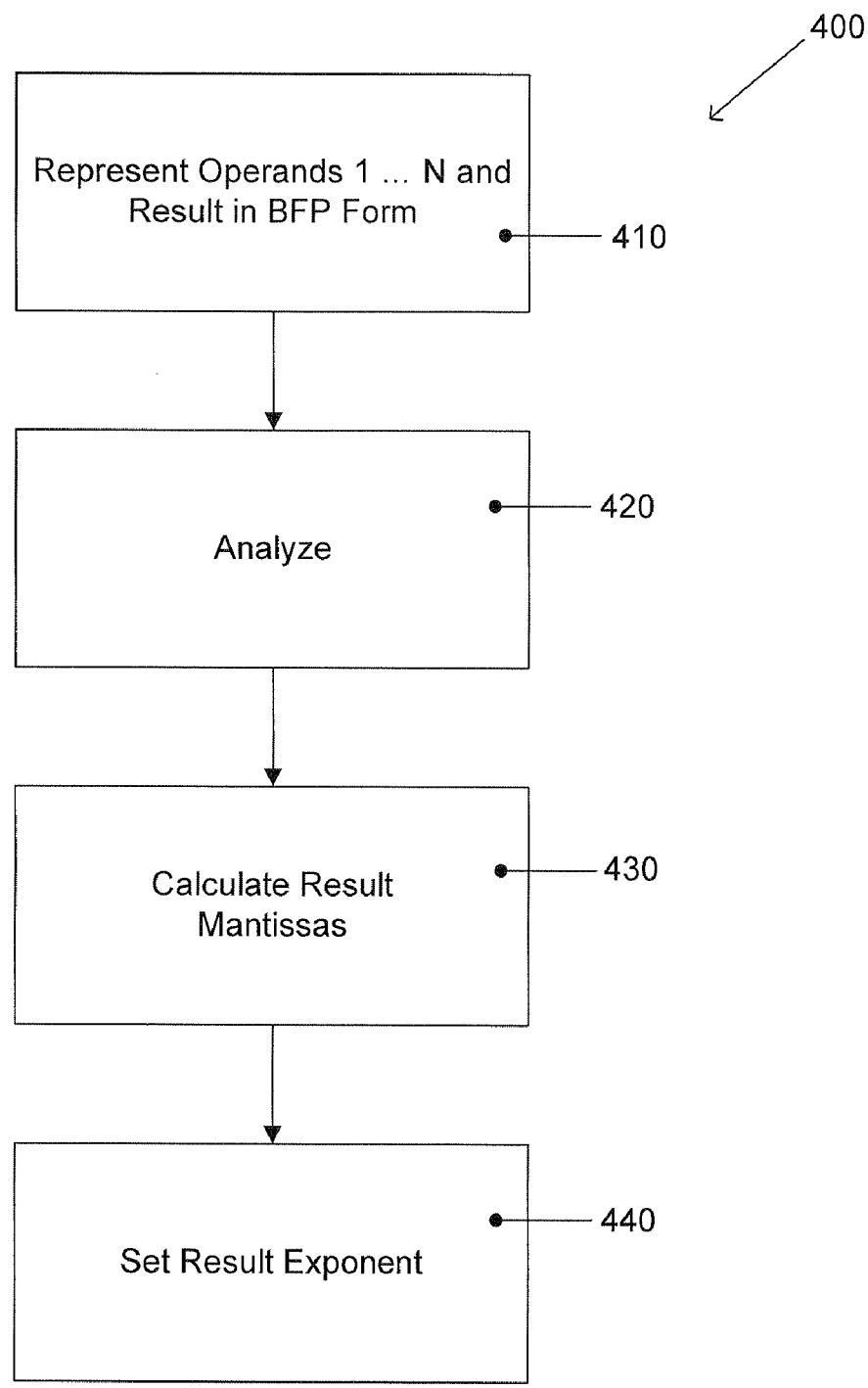
FIG. 4 is a simplified flowchart of a method according to one embodiment.

FIG. 4 is a simplified flowchart of a BFP-based method 400 according to one embodiment. The method 400 includes four basic steps: a BFP-formatting step 410, an analysis step 420, a calculation step 430, which typically may entail processing arrays of BFP numbers in a loop, and a scaling step 440 to set the exponent of the result of the calculation step 430. In one embodiment, the analysis step 420, which analyzes the operands for overflow and accuracy concerns, is preferably executed prior to the calculation step 430 and therefore may be referred to as a "pre-analysis" step. The result-scaling step 440 is preferably executed outside (either before or after) the loop in which the calculation step 430 is performed.

The analysis step 420, calculation step 430 and the result-scaling step 440 assume that the operands and result are represented in respective BFP formats. The BFP-representation step 410 may explicitly or implicitly be part of the method 400. If necessary, the BFP-representation step 410 represents the operands in BFP formats, such as by conversion from other formats or by instantiation of BFP variables.

Although the examples herein apply the analysis step 420 and the calculation step 430 to two or three operands, the method 400 may be applied to any arbitrary number, N, of operands. Likewise, the dimensionality of the operands is also arbitrary. That is, the operands may be scalar values, one-dimensional arrays (e.g., vectors), two-dimensional arrays (e.g., matrices or images), or arrays of higher dimensionality. Operands may be represented in a signed or an unsigned format. Not all operands need be the same size or type.

The analysis step 420 determines scaling factors or exponent values for each of the operands. In other words, the analysis step 420 prepares shift or scaling factors for scalable operands. As mentioned, goals of the analysis step are to avoid overflow and to prevent loss of accuracy in the calculation. Details of examples of techniques by which the analysis step 420 operates are presented below in this document. As will be seen, the analysis step 420 can automate operand scaling, effectively relieving the user/programmer from overflow and accuracy management. The analysis step 420 does not require range estimation because a BFP format, like a floating-point format, typically provides a very wide range. The analysis step 420 can be performed prior to the calculation step 430 and thus outside of the loop in which the calculation step 430 may be performed. As such, the analysis step 420 can be performed efficiently, only once. Furthermore, the method 400 is compatible with any underlying hardware, as the analysis step 420 does not presuppose knowledge of the architecture of any specific processor. Finally, as will be seen below, the analysis step 420 can be scaled to accommodate complex operations comprising multiple simpler operations.

Figure 5:
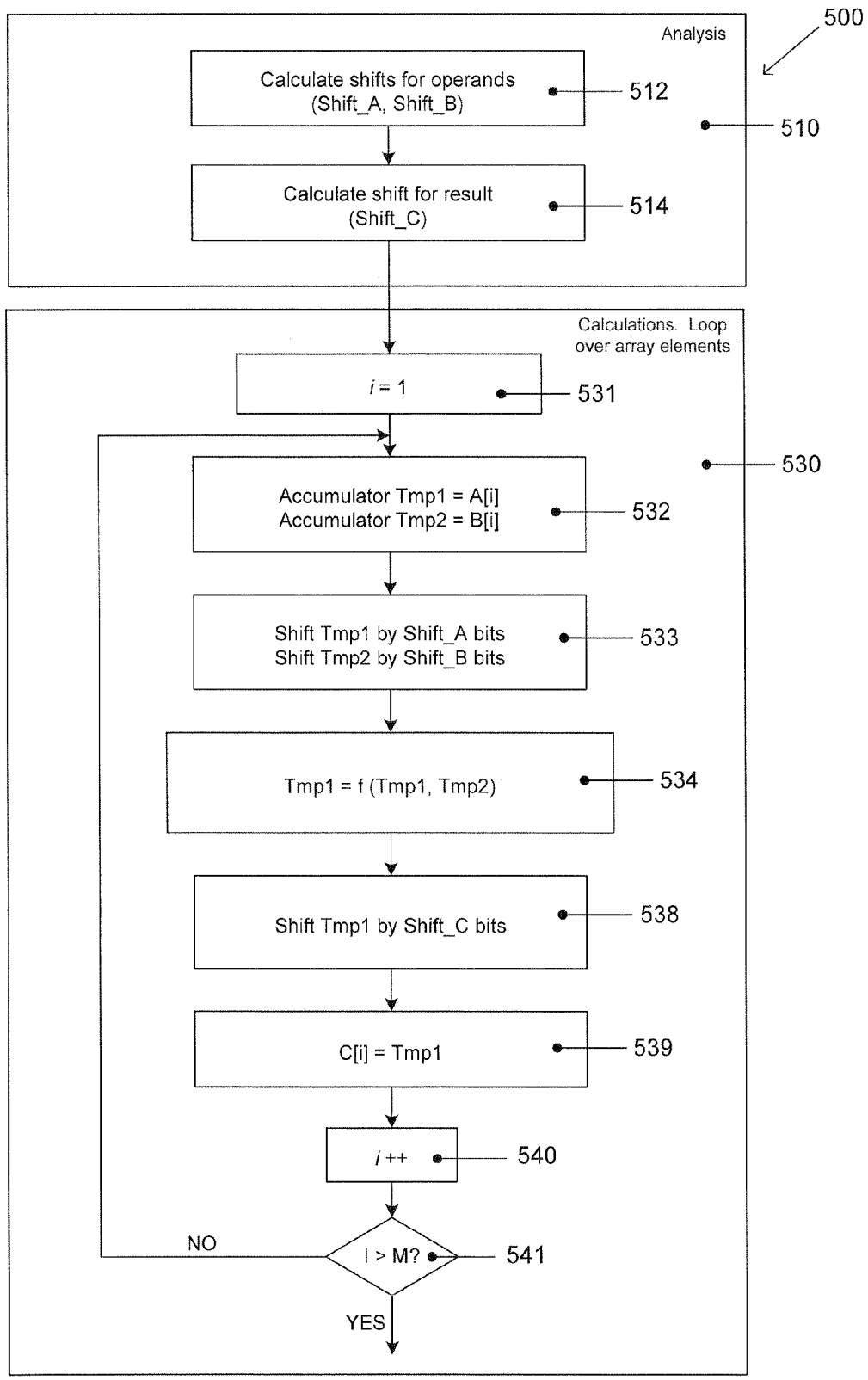
FIG. 5 is a flowchart of a method according to another embodiment.

FIG. 5 is a flowchart of a method 500 according to an embodiment that outlines specific operations applied to a case with two BFP-formatted vector operands A and B as arguments of a generic binary function (i.e., function of two variables) f(A,B), yielding a result C. The outputs of the analysis step 510 are three bitwise shift values shift_A, shift_B and shift_C, for A, B and C, respectively, according to this example. The analysis step 510 comprises a first step 512 that calculates shift_A and shift_B, followed by a second step 514 that calculates shift_C, if necessary. The steps 512 and 514 need not be performed in the order shown.

Next, the method 500 comprises a calculation step 530, which performs operations within a loop. In this example, each of the operands A and B and the result C is assumed to be a vector having M elements. A loop counter variable i is utilized to index into the elements of A, B and C. Each iteration through the loop computes one element of the result C. Thus, the loop counter variable i increments from 1 to M (or from 0 to M−1, if more appropriate), once for each iteration through the loop. Before the loop begins, the loop counter variable i is initialized (step 531). The first step (step 532) in the loop is a transfer or assignment of the operands into accumulators, denoted Tmp1 and Tmp2, respectively, which may be any arithmetic hardware unit, register or software variable suitable for performing the underlying operations. Computation can be facilitated by manipulating operands in one or more accumulators, instead of operating on the operands directly. The accumulators may include extra bits to accommodate interim large numbers without intermediate scaling. After loading the accumulators, the operands therein are shifted (step 533) in accordance with the shift_A and shift_B values determined by the analysis step 520. This shifting entails shifting the bits in the mantissa left or right some number of positions. Next, at step 534, the calculation step 530 performs the operation f on the shifted operands. The result of this operation may be stored in one of the accumulators originally used to store one of the operands, such as in the Tmp1 accumulator as illustrated in this example, or elsewhere. Next, the result is shifted by shift_C bits, if necessary (step 538) and stored in the result variable C (step 539). The loop variable i is incremented (step 540) and tested (step 541) to determine if all elements of the array have been processed.

Not illustrated in FIG. 5 is a step after the calculation step 530 to set the exponent of the result C (i.e., the common exponent for all values in the array of mantissa values for C) in accordance with the shift_C value and any other pertinent variables, such Shift_A, Shift_B, and the exponents of the operands A and B. If the result exponent should overflow (be too large positive to fit in the limited number of bits set aside to store the exponent) or underflow (too large negative), then the method 500 can throw an exception, set a flag or take another appropriate action. While exponent overflow or underflow is theoretically possible, it is typically rare for BFP representations, as having just one common exponent for a whole set of numbers allows a large number of bits to be utilized for the common exponent without an appreciable memory impact.

As can be seen, the calculation step 530 is well-suited for a loop. Because DSPs are often designed to execute loops efficiently, the calculation step 530 is especially well-suited for such DSPs or other loop-optimized processors. The shifting operations 533 and 538 may also be well suited for many DSPs, which often contain separate shift execution units (e.g., the shifting operations 533 and 538 that can be done in parallel with the arithmetic operation 534). The calculation step 530 can take advantage of that capability, as intensive shifting in the calculation step may not cause an appreciable performance penalty.

Figure 6:
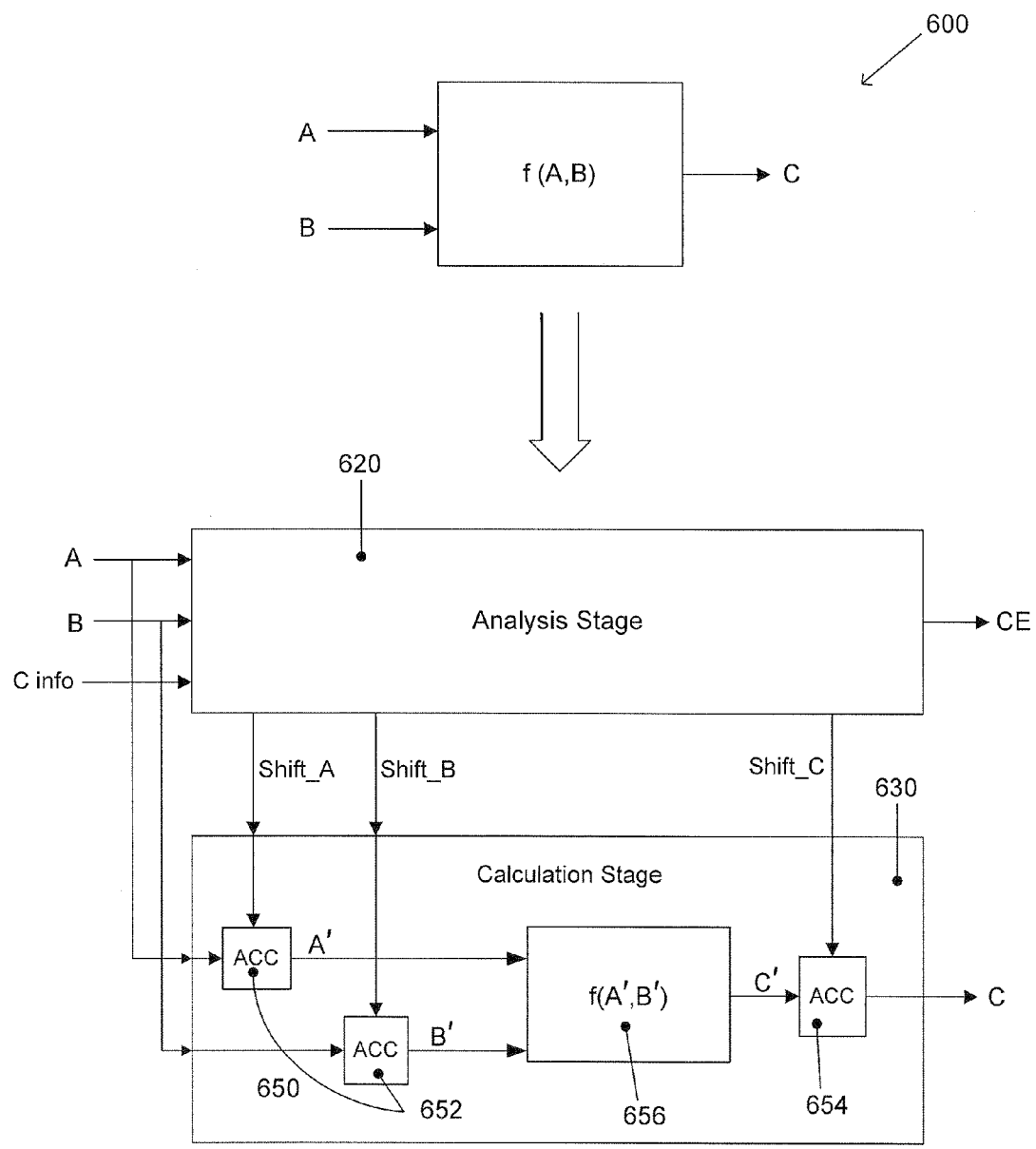
FIG. 6 is an operational block diagram of the method of FIG. 5.

FIG. 6 is an operational block diagram showing the transformation of a generic two-argument function into a form by which a method such as the method 500 operates. The top portion of FIG. 6 depicts the function as a generic "black box" library function f with input arguments A and B, and output C. The black box function f in the top portion assumes the essentially unlimited range and accuracy of floating-point numbers and is invoked without regard to implementation issues, such as overflow, preservation of accuracy, speed of execution and hardware requirements. Implementation illustrated in the bottom portion of FIG. 6 500 performs the arithmetic function f. The implementation in the bottom portion translates the generic problem into one that can be implemented efficiently by representing operands A and B and result C in a BPF format and using the method 500 to perform the function f in a manner that sustains accuracy and avoids overflow.

An analysis stage 620 analyzes A and B and information regarding C to determine the shift values Shift_A, Shift_B and Shift_C, as well as the exponent of the result CE. The mantissas of the operands A and B are stored in accumulators 650 and 652, where they are shifted in accordance with those shift values, to generate shifted operands mantissas A' and B'. The function f is performed on the shifted operand mantissas A' and B' to yield a shifted result C', which is stored in an accumulator 654, which may be the same as either accumulator 650 or 652. The shifted result C' is then shifted by the shift value Shift_C to yield the mantissas of the result C. Although the function in the upper portion of FIG. 6 and in block 656 in the lower portion are denoted with the same symbol, f, there may be differences owing to the fact that the function f in the lower portion operates element-wise on mantissas whereas the arguments of the function in the upper portion comprise floating-point numbers and the function in the upper portion may operate on entire objects to generate an entire object (i.e., mapping two general objects to a third object). The function in the upper portion may operate element-wise (e.g., $C_{ij}=A_{ij}*B_{ij}$) or otherwise (e.g., linear algebra matrix times matrix, matrix times vector, vector times matrix, or vector times vector). Other differences may arise for other reasons, such as approximations.

The analysis step 520 or analysis stage 620 attempts to balance three constraints. The first constraint is that all mantissas $M_i$ must fit within a prescribed binary word length without overflowing to the left. As more calculations are performed, mantissa values may grow and the mantissa perhaps may need to be right-shifted to ensure overflow does not occur. A single bit right shift to mantissa $M_i$ entails incrementing exponent E by one bit, accordingly. However, the BFP format's requirement that a common exponent E be shared by all mantissas in a particular array imposes a second constraint: scaling of mantissas $M_i$ within an array must be coordinated (unlike floating-point format) so that each mantissa is maintained within the fixed word length while making a common adjustment to E. The third constraint is that each mantissa $M_i$ becomes less accurate as it is shifted to the right and information is lost. Therefore, it is advantageous to execute the minimum possible number of right shifts necessary to meet the first two constraints. The analysis step 520 or stage 620 is where the mantissa shift value and the exponent adjustment are determined prior to entering the loop in the calculation step 530 or calculation stage 630. After the calculation result C has been obtained, a pre-calculated shift is applied to C and its exponent set accordingly.

By way of a concrete example, consider the following specific case of addition for two unsigned scalar BFP-formatted operands A ($760_{10}$) and B ($62_{10}$) with mantissas M and exponents E as shown:

$A=01011111*2^3(M_A=01011111, E_A=3)$ $B=00011111*2^1(M_B=00011111, E_B=1)$

To determine shift values for A and B in this example, the first step is to inspect the exponents $E_A$ and $E_B$ and note that they differ by 2. To equate exponents then, either $M_A$ may be shifted to the left while decrementing $E_A$, or $M_B$ may be shifted to the right while incrementing $E_B$. $M_A$ should not be shifted to the left by 2 bits, however, because of overflow. A simple solution is to leave $M_A$ alone and to shift $M_B$ to the right by 2 bits so that $E_A=E_B=3$. In this case, B becomes less accurate as it loses two bits' worth of information in the shift. A preferred solution is to shift $M_A$ to left by 1 bit and $M_B$ to the right by 1 bit (i.e., Shift_A=+1 and Shift_B=−1), thus preserving some accuracy for B, because only one bit of information is lost instead of two, while the accuracy of A remains unaffected. Thus, $A=10111110*2^2$, $B=00001111*2^2$.

With matched exponents, the values of operands A and B may easily be added, producing a result C=A+B=11001101*$2^2=820_{10}$, which differs by 2 from the true result $760_{10}+62_{10}=822_{10}$ due to the accuracy lost in shifting operand B by one bit.

In the preceding example, $M_A$ was shifted left one position instead of two positions because $M_A$ shifted left once did not overflow, whereas $M_A$ shifted left twice would have overflowed. Another, more conservative approach would be to leave at least one leading zero in each operand so that their sum does not overflow. According to that approach, $M_A$ would not be shifted and $M_B$ would be shifted right two bit positions:

$A=01011111*2^3$, $B=00000111*2^3$.

The result in this case is $C=A+B=01100110*2^3=816_{10}$, which differs by 6 from the true result $822_{10}$ due to the accuracy lost in right-shifting operand B by two bits.

The analysis step 520 or analysis stage 620 determines, for the general case of any combination of operands, the optimal shift values for the function f. In general, arguments passed to the analysis stage 620 may include operand exponents and extreme values (minimum and/or maximum, either theoretical or actual) of the operand mantissas. The operand exponents are examined, and adjustments to the exponents are determined. Operand shifts for A and B are based on the extreme mantissa values and the degree of exponent adjustment required. Because the shift for the result C depends on the size of the operands, the result shift may be determined even when the result C itself is not yet known. Return values supplied by the analysis step therefore include shift values for all three arrays A, B, and C, in which all elements of the same mantissa array are shifted by the same factor. Note that the analysis need not perform any shifting; it can merely calculate how many bits to shift each array, and the actual shifting can be performed in the calculation loop.

The extreme values may be either actual, estimated or theoretical. Utilization of actual or estimated extreme values can sometimes enable the algorithm to preserve more accuracy than utilizing theoretical extreme values. Actual values can be determined by use of a maximum and/or minimum function to select the maximum or minimum mantissas for a BFP-formatted set of numbers. Alternatively, It may be sufficient to estimate the maximum or minimum values using upper or lower bound estimates. For example, the position of the leading one in an unsigned number can provide an adequate estimate. Theoretical extreme values can be easily ascertained based on the variable type. For example, in the C programming language and its variants, the size of a particular type of variable can be easily ascertained.

In general terms, the algorithm for calculating shift_A and shift_B in the case of vector addition C=A+B for unsigned operanus is as follows. First, the exponents of the two operands are compared to determine how much shifting is needed to match them. Then, the operand with the larger of the two is shifted left and its exponent decremented until the exponents are matched, without incurring overflow. If left-shifting that operand is insufficient to match exponents, the operand with the smaller of the two exponents is then right-shifted and its exponent incremented until the exponents match. Once the exponents are matched, the operands may be added.

Figure 7:
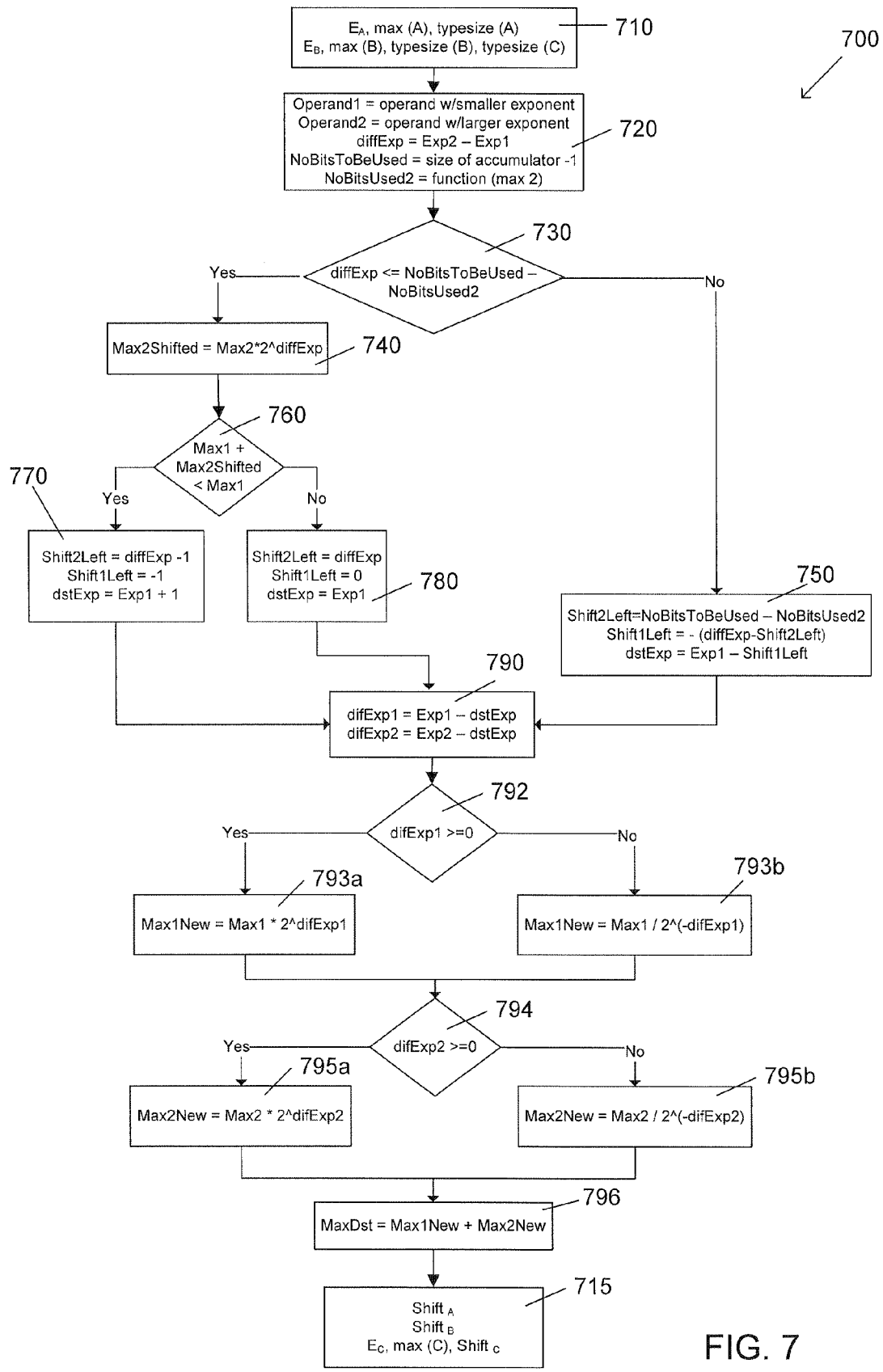
FIG. 7 is a flowchart of an analysis algorithm for the operation C=A+B.

FIG. 7 is a flowchart of an analysis algorithm 700 for the operation C=A+B, where A and B are positive numbers. The analysis algorithm is a general algorithm for the addition of any two objects. Arguments 710 that are passed to analysis algorithm 700 include the exponent, maximum, and data type size of each operand A and B and the data type size of the result C. Arguments 715 (at the bottom of FIG. 7) that are calculated by the analysis algorithm 700 and returned to the calling routine include the shifts for operands A and B, and the exponent and maximum values of the result C. An assignment block 720 begins by establishing which operand has the smaller exponent ("operand 1") and which has the larger exponent ("operand 2"). An assignment block 720 also calculates the difference between exponents, diffExp, which establishes how much total shifting must be done to match the exponents.

A decision block 730 then branches according to whether or not left-shifting operand 2 by diffExp bits will cause the result to overflow. If shifting operand 2 will not incur overflow, the program flow branches to the left and operand 2 is left-shifted in assignment block 740. If there is a risk of overflow, an assignment block 750 shifts operand 2 left by as many bits as possible without incurring overflow, and decrements its exponent accordingly. Operand 1 is then right-shifted by the remaining number of bits necessary to match exponents. (Note that a right shift is expressed as a negative left shift. For example, right-shifting by one bit is expressed as left-shifting by −1 bits).

A decision block 760 branches according to whether or not, once the left-shifting of operand 2 is completed, there will be an overflow situation upon adding operand 1 to the shifted operand 2. If adding would cause overflow, an assignment block 770 prevents such overflow by left-shifting operand 2 by one less bit, and right-shifting operand 1 by one more bit to compensate, if adding would not cause overflow, an assignment block 780 simply left-shifts operand 2, and does not shift operand 1. After the operand shifts have been calculated, the matched exponent for the result $E_c$ is stored in a destination exponent variable "dstExp," in either assignment block 750, 770, or 780.

The remaining steps in the flowchart 700 predict the maximum size of the result mantissa C based on the new sizes of the operand mantissas A and B after shifting. First, an assignment block 790 compares the original exponents for both operands with the final matched exponent dstExp, and records how far each operand mantissa was shifted. Decision blocks 792 and 794 branch according to whether the operands were left-shifted or right-shifted, and therefore whether they occupy more or fewer bits relative to their original size. Assignment blocks 793a and 793b adjust the maximum size of operand 1, and assignment blocks 795a and 795b adjust the maximum size of operand 2. The maximum size of the result, or destination, mantissa C after adding operands is then calculated and stored in variable MaxDst in an assignment block 796.

For the two operands A and B, the direction of mantissa shifting is not known a priori. Considering just the direction of the shifting and not its magnitude, there are four possibilities: (left,left), (left,right), (right,left) and (right,right). To avoid having multiple branches for each possibility and having conditional (e.g., if-then) statements in a loop, it can be advantageous to calculate and output four shift values: A_Shift_Left, A_Shift_Right, B_Shift_Left, and B_Shift_Right. The net shift to operand A is the combination or sum of A_Shift_Left and A_Shift_Right, for example. Any arbitrary shift in either direction can be specified in this way. If those shift values are constrained to be non-negative, then a zero value can be used for one of the left and right shift values while the other holds a positive value.

The result shift value, C_Shift, may be utilized for typecasting or casting the result variable, which may be of a different size or type from the operands or the accumulator. For example, if the result C has fewer mantissa bits available than the accumulator in which the final result is computed, then it may be necessary to right shift the result to fit the result variable.

The preceding example of the analysis logic was for addition of positive numbers as an example to convey the principles involved without undue complication. Addition of negative numbers would entail consideration of minimum values in a way analogous to maximum values in this example. The analysis logic for subtraction is the same as for addition.

For a multiplication operation, the analysis algorithm can be simpler. Again, the goal is to avoid overflow by left shifting as necessary while maximizing accuracy by left shifting no more than necessary and by shifting the least harmful of the operands. One analysis algorithm for the multiplication operation C=A*B is to shift the operands by a combined amount N known to be such that the product will not overflow. N can be determined based on the size of the operands A and B and the maximum size that can be accommodated as the product. For example, multiplication of a five-bit number (e.g., 00011001) and a four-bit number (e.g., 00001011) will require at most nine bits for the result. Given N, the logic is to first shift the larger operand's mantissa (i.e., the one with the leftmost 1 bit for unsigned numbers) by some number M so that the leftmost leading-1 bits of A and B line up. Next, shift both operands by half the remaining amount ((N−M)/2). If N−M is odd, then one of the operands can be shifted one bit more than the other operand.

As a concrete example of the foregoing algorithm for analysis of a multiplication operation, consider the following scalar unsigned numbers with eight-bit mantissas:

$A = 00000011 * 2^3$ $B = 00000111 * 2^1$

In this case, no scaling is needed. The product $C=A*B=00010101*2^{(3+1)}$ does not overflow, as multiplication of a two-bit number and a three-bit number requires only 5 bits, which fits within the 8-bits allocated for the result. As a more interesting example, consider $A = 00011111 * 2^3$ $B = 00111111 * 2^1$ In this case, scaling is required, as multiplication of the five-bit mantissa for A by the six-bit mantissa for B requires eleven bits, whereas only eight bits are allocated for the result. Thus, N=11−8=3. The first step is to shift B right by one (M=1) so that the size of the two mantissas is the same:

$A = 00011111 * 2^3$ $B = 00011111 * 2^2$

Next, shift each right by (N−M)/2=(3−1)/2=1 bit to yield:

$A = 00001111 * 2^4$ $B = 00001111 * 2^3$

The product $C=A*B=11100001*2^{(4+3)}$ can then be computed without overflow.

C++ function for analysis of two signed BFP objects for addition and multiplication can be specified as follows:

analysisForObjAddObj <Src1Type, Src2Type, Accumulator>
(src1Scale, src1Max, src1Min, // inputs for first operand
src2scale, scr2Max, src2Min, // inputs for second operand -continued

```
src1LeftShift, src1RightShift, // output shift values for first operand
src2LeftShift, src2RightShift, // output shift values for second operand
accScale, accMax, accMin); // outputs for result in accumulator
analysisForObjMultipliedByObj <Src1Type, Src2Type, Accumulator>
(src1Scale, src1Max, src1Min, // inputs for first operand
src2scale, scr2Max, src2Min, // inputs for second operand
src1RightShift, src2RightShift,// output shift values for first operand
accScale, accMax, accMin); // outputs for result in accumulator
```

Src1Type and Src2Type are the variable types of the operands, and Accumulator is the type of the variable used for temporary results. The inputs src1Scale and src2Scale are the exponents for the first and second operands, respectively. The src1Max and src1Min inputs are the maximum and minimums for the first operand, while src2Max and src2Min are the same for the second operand. As previously mentioned, these inputs may be actual or simply based on the size for the variable types utilized for those mantissas; minimums need not be considered for unsigned numbers. The outputs src1LeftShift and src1RightShift are the shift values for the first operand; one is non-negative, and the other is a zero "dummy" shift value. The outputs src2LeftShift and src2RightShift are the same for the second operand. The outputs accScale, accMax and accMin are the exponent and extreme values for the output in the accumulator, respectively. A difference between the signatures of these two analysis methods is that addition may involve shifts to the right or left, whereas multiplication shifts the operands only to the right.

Analysis for matrix multiplication follows from the preceding examples and principles. Consider the general case of N×N matrix multiplication wherein each matrix element has L bits to represent its mantissa. Let the two operands be A and B. Assume for the sake of definiteness and simplicity that every element of A is $00011111*2^3$ and every element of B is $00111111*2^1$. By way of example, let N=3 and L=8. Then the calculation of $C_{11}$ is $A_{11}*B_{11}+A_{12}*B_{21}+A_{13}*B_{31}$. First, shift the B mantissas right by one to equalize the size of the B mantissas to the A mantissas:

$$A=00011111*2^3$$

$$B=00011111*2^2$$

Now, shifting all mantissas (for both A and B) by an amount equal to (L−(N−1)/2 or (8−(3−1))/2=2 bits yields:

$$A=00000111*2^5$$

$$B=00000111*2^4$$

The result can now be calculated as $C_{11}$=AB+AB+AB=$10010011*2^{(5+4)}$.

Other elementary operations besides addition, subtraction, and multiplication can be included. For example, logic for performing analysis for an element-wise division operation follows from the same principles. Another operation that can be handled in the same general framework is assignment (i.e., assigning one variable to have the same value as another variable). Because the variables may be of different type or size, overflow and accuracy may be considered. Assignment (or casting) is just the special case of determining the shift result for the result (e.g., C_Shift in the above examples). A C++ function for analysis of type casting assignment of an object can be specified as follows:

```
analysisForCasting <DestType, Accumulator>
(accMax, accMin, // inputs
dstRightShift, dstMax, dstMin); // outputs
```

DestType is the variable type for the result. The output dstRightShift is used to calculate the exponent of the final destination as follows: dstScale=accScale+dstRightShift.

Given a set of simple or elementary operations, compound or complex operations can also be handled in the manner described in the following paragraphs. For example, matrix and vector multiplication can be reduced to a sequence of additions and multiplications according to well-known linear algebra formulas. Other operations such as convolution or correlation can be handled similarly. Operations such as cosine(A) or $e^A$ can also be handled in an analogous way as a set of simpler operations for approximation (e.g., truncated power series).

Figure 8:
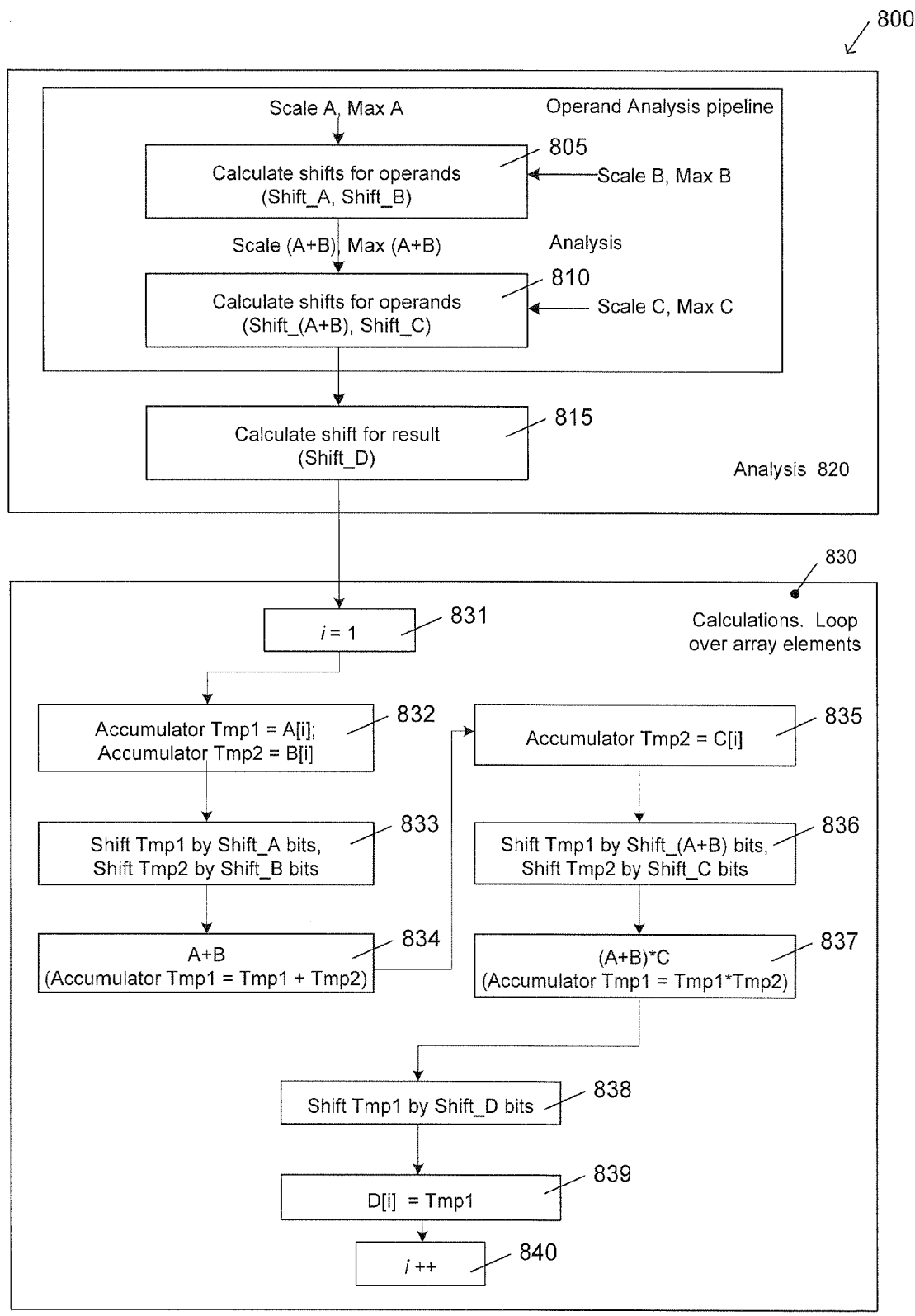
FIG. 8 is a flowchart for a method according to one embodiment for a compound operation of the form D=(A+B)*C.

Compound operations can be executed in a pipeline so that the output of one operation becomes an input operand to the next operation. For instance, a pipeline for executing a three-operand expression D=(A+B)*C would first compute an intermediate sum of two operands A+B, and then compute the product of the intermediate sum and operand C. FIG. 8 is a flowchart for a method 800 according to one embodiment for executing such a compound operation of the form D=(A+B)*C, analogous to the flowchart for a single operation shown in FIG. 5. The analysis 820 that entails determining shift values for the operands A, B, and C and for the result D, occurs in assignment blocks 805, 810, and 815, prior to entering a main calculation loop 830 that implements the pipelined sequence of operations. The analysis step 820 is analogous to the analysis step 510, and the calculation loop 830 is analogous to the calculation loop 530.

Comparing FIG. 8 with FIG. 5, steps 832-834 in which operands are loaded into accumulators, the pre-determined shifts are performed, and the addition operation is performed, are identical to steps 532-534. New steps 835-837 implement the second elementary operation in the compound operation: step 835 loads operand C into the accumulator, similar to step 832; step 836 shifts the two operands (A+B) and C, similar to step 833; and step 837 performs the multiplication operation, similar to step 834. Thus, in the pipeline, the operand (A+B) replaces operand A, and the operand C replaces operand B. Finally, steps 838-840 are identical to steps 538-540 except they are applied to the final result D instead of C. Because all operations fundamentally break down into a sequence of addition or multiplication operations, any combination that forms a compound operation may be handled using a pipeline approach according to method 800, for example, matrix/vector operations, convolution, correlation, etc.

As an example of pipeline operation analysis, consider the example operation C=(A+B)*C, where all operands' mantissas are stored in unsigned eight-bit variables, eight-bit accumulator variables are utilized, and the final result is stored in an unsigned four-bit variable. Consider the following values by way of example:

$$A=00111111*2^3$$

$$B=00011111*2^1$$

$$C=01111111*2^{-1}$$

The first step is analysis for the operation A+B. The pertinent inputs to the analysis function analysisForObjAddObj are Size1=Size2=8 (known from the Src1Typle and Src2Type variable types), src1Scale=3, src1Max=00111111, src2Scale=1 and src2Max=00011111. The pertinent outputs of the first-step, addition function are src1LeftShift=1, src1RightShift=0; src2LeftShift=0, src2RightShift=1, accScale=2, and accMax=10001101. The second step is analysis for the multiplication operation. The pertinent inputs to the analysis function analysisForObjMultipliedByObj are Size1=Size2=8 (known from the Src1Typle and Src2Type variable types), src1Scale=accScale=2 (output of first analysis function), src1Max=accMax=10001101 (output of first analysis function), src2Scale=−1 (for operand C), src2Max=01111111 (for operand C). The outputs of the second analysis function are src1LeftShift=0, src1RightShift=4, src2LeftShift=0, src2RightShift=3, accScale=12, and accMax=01111000. The final function called for typecasting to a four-bit result is analysisForCasting. Its input arguments are SizeAcc=8, SizeDst=4 (known from the variable types) and accMax=01111000 (output from previous function); the outputs are dstRightShift=4 and dstMax=1111.

III. COMPUTER SYSTEMS

Figure 9:
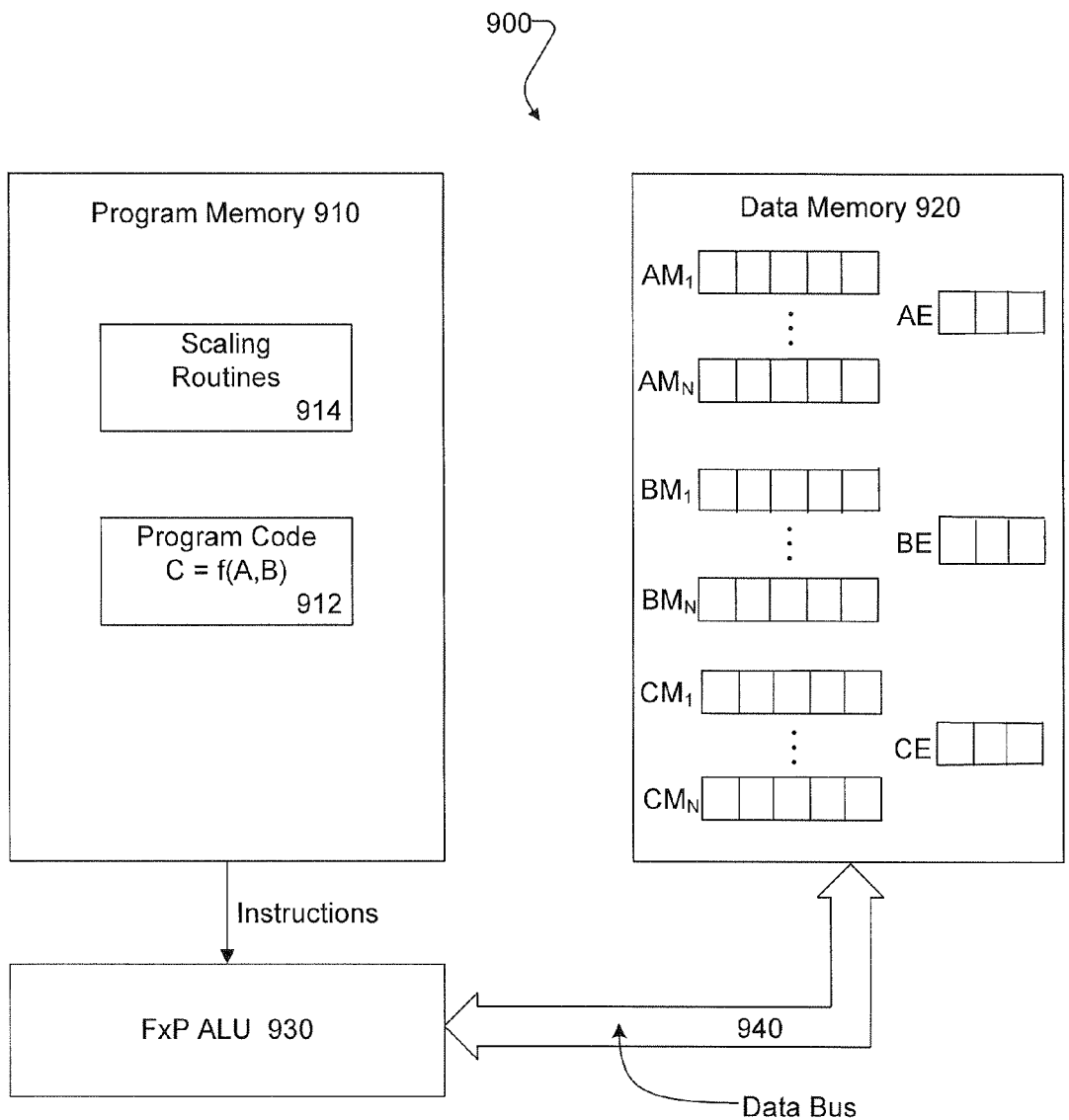
FIG. 9 is a block diagram of a computer system according to one embodiment.

FIG. 9 is a block diagram of a computer system 900 according to one embodiment. The computer system 900 is suitable for implementing a method such as the method 500 and related methods. The computer system 900 may include as its components a program memory 910, a data memory 920, a computational arithmetic logic unit (ALU) 930, and a data bus 940 connecting the ALU 930 to the data memory 920. The program memory 910 and the data memory 920 may be physically and/or logically apart or together. The program memory 910 contains program code 912 that calls for an operation C=f(A,B) to be performed. The program code 912 may be an image or video processing application, for example. A two-input function is depicted for illustration; the number of input variables may be more or less. The variables A, B and C may be any objects, but as illustrated in FIG. 9, each is a BFP-formatted data structure having an array of mantissas as well as a common exponent for all mantissas for an array, stored in the data memory 920. Each mantissa and exponent is stored in the memory as a bit pattern, as shown. Because the number of bits used to represent the variables A, B and C is finite, there are risks of overflow and loss of accuracy caused by the operation f.

The program memory 910 contains one or more scaling routines 914 designed to reduce the risks of overflow and loss of accuracy, for example as described above in the specification of the methods 400 and 500. The scaling routines 914 are called by the program code 912 to analyze the operand variables A and B to determine scaling factors for each. The scaling routines are preferably low-overhead analysis functions performed before a calculation loop in the program code 912. Data memory 920 provides a location for storing operands A, B, and C in arrays according to a BFP format, such as the BFP representation 300. For example, array A includes as its elements, manitissas $AM_1, \ldots, AM_N$ with shared exponent AE. The scaling factors are chosen on the basis of extreme mantissa values of the operands (e.g., $\min(AM_1, \ldots, AM_N)$, $\max(AM_1, \ldots, AM_N)$, $\min(BM_1, \ldots, BM_N)$, $\max(BM_1, \ldots, BM_N)$) and a permissible range of mantissa values for the result C. The scaling routines 914 determine the scaling factors by attempting to maximize accuracy of the result C subject to the constraint that overflow of the result C be avoided. The scaling routines 914 return mantissa shift values for each of the operands A and B and the result C. Both left and right shift values are permissible. The scaling routines 914 may, for example, implement the analysis step, logic or stage described above with relation to FIGS. 4-8. The shift values determined by those analysis blocks are scaling factors that the scaling routine 914 may generate. The scaling routines 914 may also be referred to as "autoscaling" routines, as they automate scaling to some extent, if not completely.

The ALU 930, which may be a fixed-point ALU as shown, is programmed to operate on the operand variables A and B to compute the result variable C. The ALU 930 may read and write those variables from/to the data memory 920 via the data bus 940. The ALU 930 executes instructions to compute an element of the result mantissa array CM using the corresponding elements of the operand mantissa arrays AM and BM as inputs. According to the sequence described in FIG. 5, for example, instructions comprising the scaling routines 914 are loaded into the ALU 930 and executed so as to produce shift values for the BFP-formatted operands A, B, and C. The program code 912 then shifts the elements of the operand mantissa arrays AM and BM in accordance with shift values returned by the scaling routines 914. The program code 912 typically comprises a loop through all elements of the result mantissa array CM to cause the ALU 930 to compute the elements of the result mantissa array using corresponding shifted elements of the operand mantissa arrays AM and BM as inputs. The program code 912 shifts elements of the result mantissa CM array in accordance with a result shift value returned by the scaling routine, as necessary. The program code can also manipulate the common exponent of the result (CE) as needed, such as incrementing or decrementing it based on the result shift values returned by the scaling routines 914, and other pertinent parameters.

Figure 10:
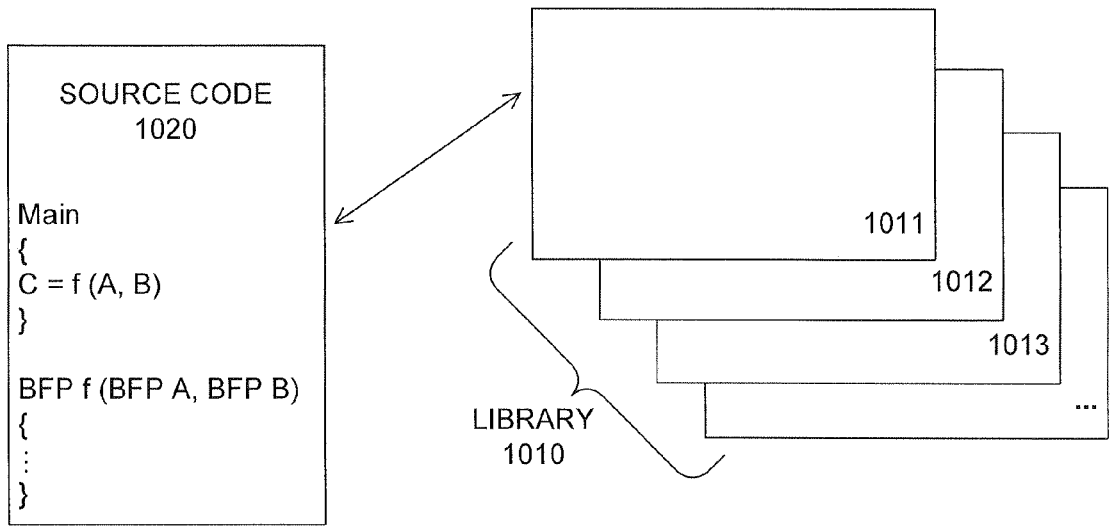
FIG. 10 is an illustration of libraries that may be invoked from a source code program, according to one embodiment

FIG. 10 is an illustration of a library 1010 of routines 1011, 1012, 1013, . . . that can be invoked from a source code program 1020, according to one embodiment. The analysis routines, scaling routines and the calculation routines described above can be included in the library 1010. Such routines for each expected operation (e.g., addition, multiplication, other arithmetic or mathematical computations, complex sequences of multiple simple operations, assignment, etc.) can be included in the library 1010. Similar to existing function libraries that process fixed-point or floating-point arrays, library functions may be constructed to process BFP objects so that a source code program 1020 may call those library routines in customary fashion, as needed to perform arithmetic operations.

As a matter of software engineering, details of the library routines may be hidden or exposed to varying degrees. For example, according to one version, the source code program 1020 may explicitly call a scaling or analysis routine before each operation and then as a next step call a calculation routine to perform the operation using the results of the scaling or analysis routine. In that version, the source code program 1020 passes and collects arguments and parameters used in the library routines. As an alternative, the library may hide more of the implementation details. For example, the library 1010 may provide overloaded operations for general operand and result objects such that when the source code program invokes an operation that the library 1010 supports, the pertinent library 1010 routines are called in the order they are required to perform the scaling or analysis followed by the operation calculation, and the library 1010 simply returns the result to the source code program 1020. In that case, the fact that there is an analysis step followed by an operation loop inside the library 1010 may be unknown to the programmer writing the source code program 1020.

Figure 11:
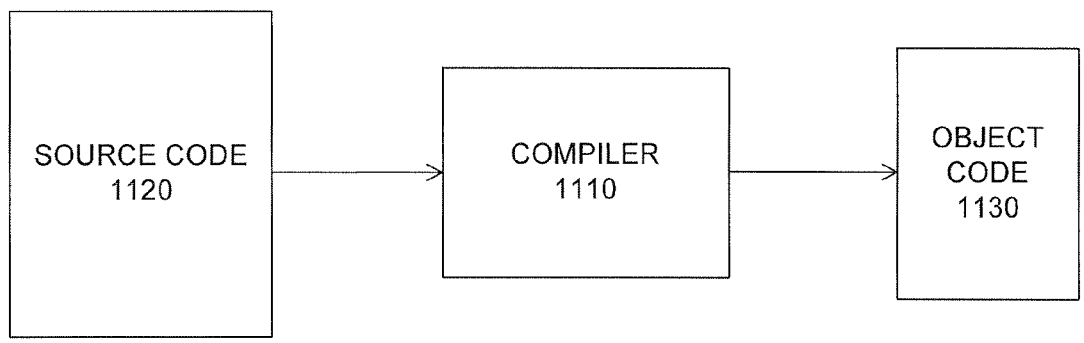
FIG. 11 is an illustration of a compiler according to one embodiment.

FIG. 11 is an illustration of a compiler 1110 according to another embodiment. The analysis, scaling, and calculation routines described above can be incorporated into the compiler 1110, which is a modified or optimizing compiler with built-in overflow and accuracy management features, as described herein. When the compiler 1110 interprets a source code program 1120 to create an object code program 1130, the compiler 1110 recognizes statements calling operations for which the compiler 1110 provides autoscaling implementations and causes those autoscaling implementations of the operations to be included or referenced in the object code 1130, so that when the object code 1130 is linked to create an executable program code file (not shown), the autoscaling implementation of the operation is included to implement the operation.

Another alternative version is a code converter or code generator that produces source code having BFP-formatted variables and the accuracy-sustaining, overflow-avoiding techniques described above. In that case, a programmer could write a program expressing computations in a simple high-level way, such as using just floating point variables. The code converter would convert the floating point variables to a BPF format and substitute pre-analyzing, accuracy-sustaining, overflow-avoiding implementations of the operations on those variables. Other alternative implementations are possible to simplify the programmer's experience in other ways.

The methods and systems illustrated and described herein can exist in a variety of forms both active and inactive. For example, they can exist partially or wholly as one or more software programs comprised of program instructions in source code, object code, executable code or other formats. Any of the above can be embodied in compressed or uncompressed form on a computer-readable medium, which include storage devices. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes.

IV. CONCLUSION

The terms and descriptions used above are set forth by way of illustration only and are not meant as limitations. Those skilled in the art will recognize that many variations, enhancements and modifications of the concepts described herein are possible without departing from the underlying principles of the invention.

For example, there are many different ways to implement an analysis algorithm depending on the desired level of accuracy. For example, the analysis algorithm described above uses rather strong restrictions to avoid overflow, but those restrictions can be relaxed. In general to guarantee no overflow for addition, the size of both operand mantissas should be equal to one less than the size of accumulator. However, it may sometimes be permissible to allow one of two operands to have the mantissa as long as the accumulator size to achieve better accuracy. Providing for the extra accuracy available in those situations complicates the implementation. As another example, it is possible to use the absolute value of maximum and minimums of mantissa values instead of using both maximum and minimum. Using the absolute value may be a less accurate approach, but it may be easier to implement. These and other variations, alternatives and equivalents are possible.

The scope of the invention should therefore be determined only by the following claims and their equivalents.

The invention claimed is:

1. A computer-implemented method of performing an operation on a set of at least one operand objects to generate a result object, the method designed to reduce the risks of overflow and loss of accuracy attributable to the operation, the method being implemented on a computer comprising a memory and an arithmetic unit, the method comprising:

representing and storing in the memory each of the operand objects in a BFP form having an array of mantissa values as well as a common exponent for all mantissa values in the array for a given object, wherein each mantissa value and common exponent is stored in the memory as a bit pattern; and generating the result object in a BFP format having an array of mantissa values and a common exponent for all mantissa values associated with the result object, wherein each mantissa value and common exponent is stored in the memory as a bit pattern, wherein the generating step comprises:

performing an analysis step to determine respective shift values for each of the operand objects and a shift value for the result object; and calculating a result mantissa value for each corresponding set of mantissa values associated with the operand objects by: shifting the stored bit patterns representing the corresponding mantissa values in the operand objects by numbers of bits equal to their respective associated shift values determined in the analysis step, performing the operation on corresponding mantissa values in the array portions of the operand objects using the arithmetic unit to generate respective preliminary mantissa values for the result object, shifting a bit pattern representing the preliminary mantissa values for the result object by a number of bits equal to the shift value for the result object as determined in the analysis step, and storing the shifted preliminary mantissa values in the array portion of the result object in the memory.

2. A method according to claim 1, wherein the set of at least one operand objects consists of one scalar operand object.

3. A method according to claim 1, wherein the set of at least one operand objects consists of two operand objects.

4. A method according to claim 1, wherein the set of at least one operand objects comprise more than two operand objects.

5. A method according to claim 1, wherein one or more of the arrays are scalar values.

6. A method according to claim 1, wherein one or more of the arrays are one-dimensional and have a plurality of elements.

7. A method according to claim 1, wherein one or more of the arrays are two-dimensional and have a plurality of elements.

8. A method according to claim 7, wherein the one or more two-dimensional arrays contain image data.

9. A method according to claim 1, wherein the operation comprises addition.

10. A method according to claim 9, wherein determining respective shift values for each of the operand objects comprises finding a common value for all of the common exponents associated with all of the operand objects.

11. A method according to claim 10, wherein the common value for all of the exponents associated with the operand objects is chosen to avoid overflow while minimizing right shifting of the mantissa bit patterns so as to sustain accuracy.

12. A method according to claim 1, wherein the operation comprises multiplication.

13. A method according to claim 12, wherein the number of operand objects is two and the operand objects are denoted A and B, wherein A has a larger mantissa than B, and determining respective shift values for each of the operand objects comprises:

shifting the mantissa of A right, if necessary, by a number of bits so that the size of the mantissa of A equals the size of the mantissa of B; and shifting the mantissas of both A and B, if necessary, right by approximately the same number of bits, wherein the same number of bits is approximately one-half of the size available for the mantissa of the result.

14. A method according to claim 1, wherein the operation comprises one or more of the set of operations consisting of assignment, subtraction, division, matrix multiplication, vector multiplication, convolution, and correlation.

15. A method according to claim 1, wherein the step of calculating a result mantissa value for each corresponding set of mantissa values associated with the operand objects comprises iterating through a loop a number of iterations equal to the number of elements in the result array.

16. A method according to claim 1, wherein the step of calculating a result mantissa value for each corresponding set of mantissa values associated with the operand objects is performed utilizing an accumulator.

17. A method according to claim 1, wherein the operation is a compound operation comprising two simple operations in an order, and the analysis step further comprises:

first determining respective shift values for each of the operand objects and a shift value for the result object for the first of the two operations; and determining respective shift values for each of the operand objects and a shift value for the result object for the second of the two operations, wherein one or more outputs from the first determining step are utilized as inputs.

18. A method according to claim 1, wherein the analysis step is based at least in part on extreme values of the operand objects.

19. A method according to claim 18, wherein the extreme values comprise maximum values.

20. A method according to claim 18, wherein the extreme values comprise minimum values.

21. A method according to claim 18, wherein the extreme values comprise actual values.

22. A method according to claim 18, wherein the extreme values comprise theoretically possible extreme values.

23. A method according to claim 18, wherein the extreme values comprise estimates.

24. A method according to claim 1, wherein the method is performed by a compiler.

25. A method according to claim 1, wherein the computer comprises a digital signal processor.

26. A computer-readable medium on which is embedded program code for implementing method of performing an operation on a set of at least one operand objects to generate a result object, the method designed to reduce the risks of overflow and loss of accuracy attributable to the operation, the method being implemented on a computer comprising a memory and an arithmetic unit, the method comprising:

representing and storing in the memory each of the operand objects in a BFP form having an array of mantissa values as well as a common exponent for all mantissa values in the array for a given object, wherein each mantissa value and common exponent is stored in the memory as a bit pattern; and generating the result object in a BFP format having an array of mantissa values and a common exponent for all mantissa values associated with the result object, wherein each mantissa value and common exponent is stored in the memory as a bit pattern, wherein the generating step comprises:

performing an analysis step to determine respective shift values for each of the operand objects and a shift value for the result object; and calculating a result mantissa value for each corresponding set of mantissa values associated with the operand objects by: shifting the stored bit patterns representing the corresponding mantissa values in the operand objects by numbers of bits equal to their respective associated shift values determined in the analysis step, performing the operation on corresponding mantissa values in the array portions of the operand objects using the fixed-point arithmetic unit to generate respective preliminary mantissa values for the result object, shifting a bit pattern representing the preliminary mantissa values for the result object by a number of bits equal to the shift value for the result object as determined in the analysis step, and storing the shifted preliminary mantissa values in the array portion of the result object in the memory.

27. An apparatus for performing an operation on a set of at least one operand objects to generate a result object, the apparatus designed to reduce the risks of overflow and loss of accuracy attributable to the operation, the apparatus works in conjunction with a computer comprising a memory and an arithmetic unit, the apparatus comprising:

a means for representing and storing in the memory each of the operand objects in a BFP form having an array of mantissa values as well as a common exponent for all mantissa values in the array for a given object, wherein each mantissa value and common exponent is stored in the memory as a bit pattern; and a means for generating the result object in a BFP format having an array of mantissa values and a common exponent for all mantissa values associated with the result object, wherein each mantissa value and common exponent is stored in the memory as a bit pattern, wherein the generating means comprises:

a means for performing an analysis step to determine respective shift values for each of the operand objects and a shift value for the result object; and a means for calculating a result mantissa value for each corresponding set of mantissa values associated with the operand objects by: shifting the stored bit patterns representing the corresponding mantissa values in the operand objects by numbers of bits equal to their respective associated shift values determined in the analysis step, performing the operation on corresponding mantissa values in the array portions of the operand objects using the fixed-point arithmetic unit to generate respective preliminary mantissa values for the result object, shifting a bit pattern representing the preliminary mantissa values for the result object by a number of bits equal to the shift value for the result object as determined in the analysis step, and storing the shifted preliminary mantissa values in the array portion of the result object in the memory.

28. A computer-implemented method for scaling a plurality of BFP-formatted operands to perform a mathematical operation on the operands to generate a BFP-formatted result, wherein each BFP-formatted operand comprises an array of operand mantissa values and a common operand exponent for all mantissa values in an operand array for an individual operand, and wherein the BFP-formatted result comprises an array of result mantissa values and a common result exponent for all mantissa values in the array for the result, the method implemented on a computer on which program instructions are executed and comprising:

analyzing, by executing instructions of a program operating on computer processing circuitry, each of the plurality of the operands to determine scaling factors for each of the operands, wherein the scaling factors are chosen on the basis of extreme mantissa values of the operands and a permissible range of result mantissa values, and wherein a criterion for determining the scaling factors is sustaining accuracy of the result subject to the constraint that overflow of the result be avoided;

on the basis of the scaling factors, shifting bit patterns representing the mantissas right to avoid overflow and left to sustain accuracy and incrementing or decrementing the corresponding exponent when the mantissas are shifted left or right, respectively; and using the computer processing circuitry to compute each element of the array of result mantissa values on the basis of corresponding shifted operand mantissa element values, from which a result mantissa element value is derived.

29. A method according to claim 28, wherein the operation comprises addition.

30. A method according to claim 29, wherein determining respective shift values for each of the operand objects comprises finding a common value for all of the common exponents associated with all of the operand objects.

31. A method according to claim 30, wherein the common exponents associated with all of the operand objects is chosen to avoid overflow while minimizing right shifting of the mantissa bit patterns so as to sustain accuracy.

32. A method according to claim 28, wherein the operation comprises multiplication.

33. A method according to claim 32, wherein the number of operand objects is two and the operand objects are denoted A and B, wherein A has a larger mantissa than B, and determining respective shift values for each of the operand objects comprises:

shift the mantissa of A right by a number of bits so that the size of the mantissa of A equals the size of the mantissa of B; and if necessary, shift the mantissas of both A and B right by the same number of bits, wherein the same number of bits is one-half of the size available for the mantissa of the result.

34. A method according to claim 28, wherein the operation is a compound operation comprising two simple operations in an order, and the analysis step further comprises:

first determining respective shift values for each of the operand objects and a shift value for the result object for the first of the two operations; and determining respective shift values for each of the operand objects and a shift value for the result object for the second of the two operations, wherein one or more outputs from the first determining step are utilized as inputs.

35. A method according to claim 28, wherein the analysis step is based at least in part on extreme values of the operand objects.

36. A computer system for implementing a floating-point array operation using an arithmetic unit while reducing the risks of overflow and loss of accuracy attributable to the operation, the system comprising:

program code that calls for an operation performed on at least one floating-point array operands to yield a floating-point array result;

memory in which is stored each of the at least one floating-point array operands in respective BFP formats as well as the result operand in a BFP format, each BFP-formatted data structure having an array of mantissas as well as a common exponent for all mantissas in its corresponding array of mantissas, wherein each mantissa and common exponent is stored in the memory as a bit pattern;

a scaling routine called by the program code to analyze the operands to determine scaling factors for each of the operands, wherein the scaling factors are chosen on the basis of extreme mantissa values of the operands and a permissible range of result mantissa values, and wherein a criterion for determining the scaling factors is maximizing accuracy of the result subject to the constraint that overflow of the result be avoided, the scaling routine returning mantissa shift values for each of the operands and the result, wherein the both left and right shift values are permissible;

an arithmetic unit programmed to compute an element of the result mantissa array using the corresponding elements of the operand mantissa arrays as inputs;

wherein the program code shifts the elements of the operand mantissa arrays in accordance with shift values returned by the scaling routine, and wherein the program code comprises a loop through all elements of the result mantissa array to cause the arithmetic unit to compute the elements of the result mantissa array using corresponding shifted elements of the operand mantissa arrays as inputs, and wherein the program code shifts elements of the result mantissa array in accordance with a result shift value returned by the scaling routine.

37. The computer system of claim 36, wherein the program code increments or decrements the common exponents of the operands and result by amounts based on the shift values returned by the scaling routine.

38. The computer system of claim 36, wherein the arithmetic unit is a fixed point arithmetic unit.

39. The computer system of claim 36, wherein the operation comprises at least one of addition and multiplication, and wherein the shift values are based at least in part on extreme values of the operands.

40. The computer system of claim 36, wherein the operation is a compound operation comprising two simple operations in an order, and the scaling routine first determines respective shift values for each of the operand objects and a shift value for the result object for the first of the two operations and then determines respective shift values for each of the operand objects and a shift value for the result object for the second of the two operations, wherein one or more outputs from the first determining step are utilized as inputs.

41. A computer-implemented method for autoscaling BFP-formatted operands, intermediate results and a final result for a complex operation that can be decomposed into a sequence of N simple operations consisting of a first simple operation followed by a second simple operation and so on up to a Nth simple operation, wherein the second and subsequent operations utilize as an operand a result from a previous operation in the sequence, the method implemented on a computer on which program instructions are executed and comprising:

analyzing, by executing instructions of a program operating on computer processing circuitry, the sequence of N simple operations in order to determine for each simple operation scaling factors for its operands and its result, wherein a scaling factor for a result of one simple operation is utilized as an input to determine a scaling factor for a subsequent operation in the sequence; and after analyzing the sequence of N simple operations, performing a calculation loop to calculate mantissa values of the final result in accordance with the complex operation and based on the mantissa values of the operands, intermediate results and their associated scaling factors determined by the analyzing step, whereby the scaling factors reduce risks of overflow and loss of accuracy otherwise attributable to the complex operation or any of its constituent simple operations.

42. A method according to claim 41, wherein N=2.

43. A method according to claim 41, wherein N>2.

44. A method according to claim 41, wherein at least one of the simple operations in the sequence is addition.

45. A method according to claim 41, wherein at least one of the simple operations in the sequence is multiplication.

* * * * *